March 7, 1950        L. D. THOSTENSON        2,499,936
FRONT END SUPPORT FOR MOTOR VEHICLES
Original Filed Sept. 9, 1946        2 Sheets-Sheet 1
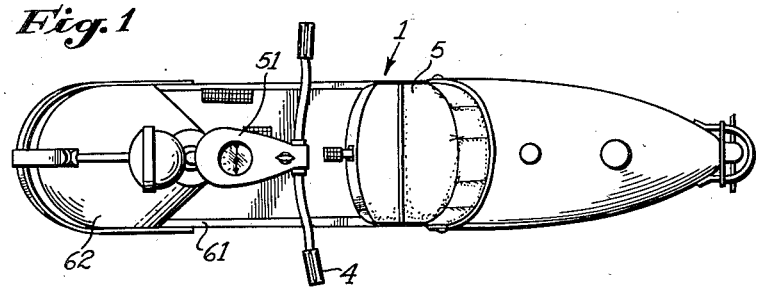
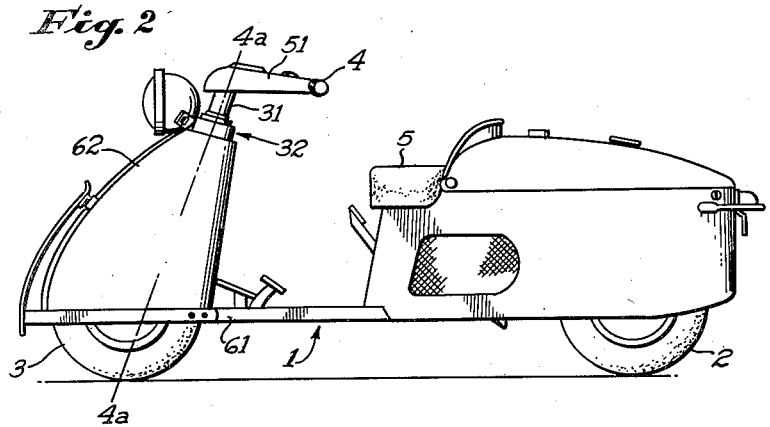
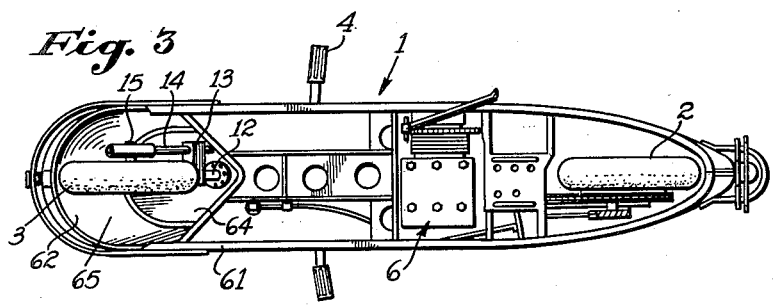
INVENTOR:
LEWIS D. THOSTENSON
BY HIS ATTORNEYS
HARRIS, KIECH, FOSTER & HARRIS March 7, 1950     L. D. THOSTENSON     2,499,936
FRONT END SUPPORT FOR MOTOR VEHICLES
Original Filed Sept. 9, 1946     2 Sheets-Sheet 2
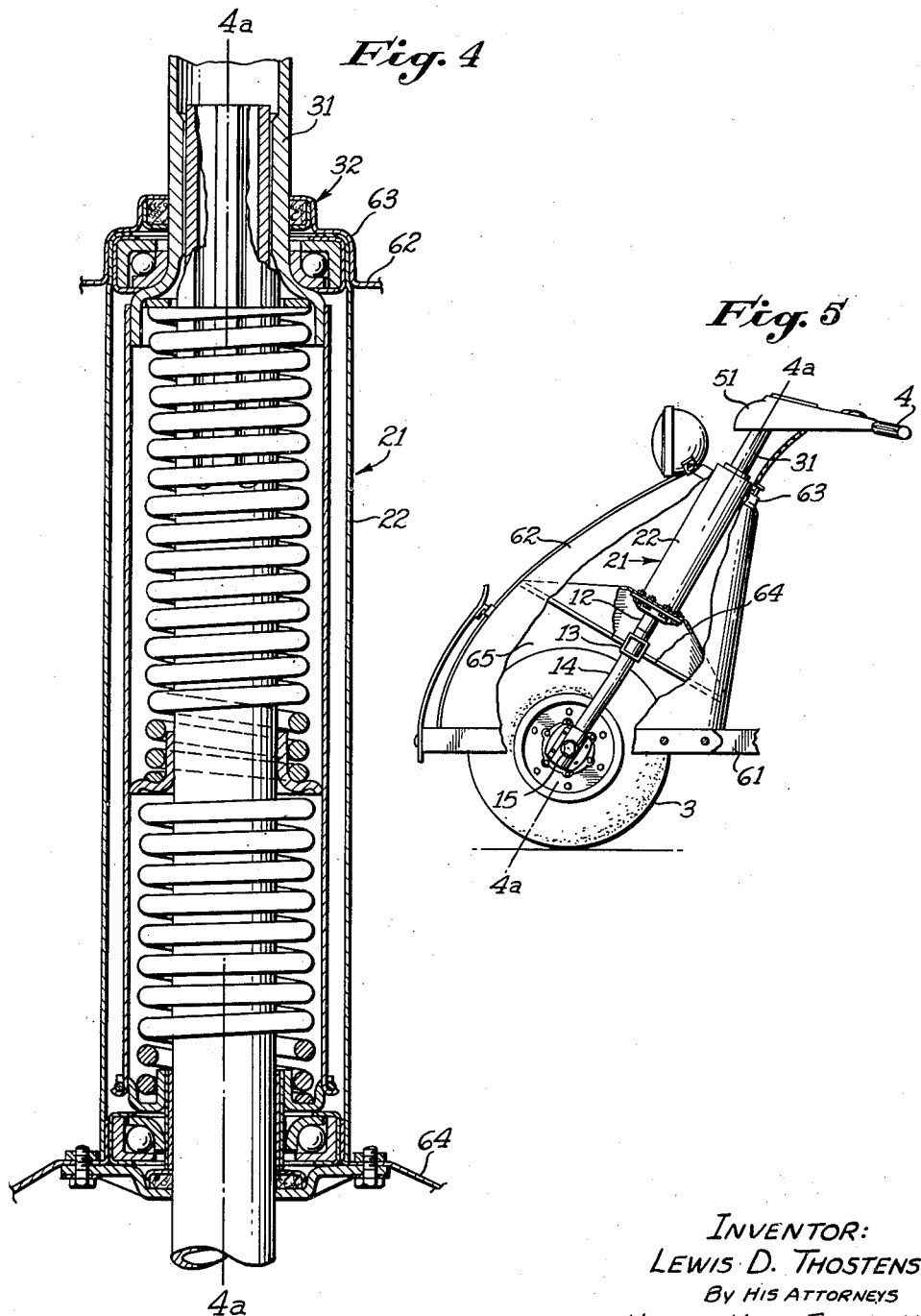
INVENTOR:
LEWIS D. THOSTENSON
BY HIS ATTORNEYS
HARRIS, KIECH, FOSTER & HARRIS Patented Mar. 7, 1950

2,499,936

UNITED STATES PATENT OFFICE 2,499,936

FRONT END SUPPORT FOR MOTOR VEHICLES

Lewis D. Thostenson, Inglewood, Calif., assignor to Salsbury Corporation, a corporation of California Original application September 9, 1946, Serial No. 695,592. Divided and this application April 28, 1947, Serial No. 744,279

5 Claims. (Cl. 280—276)

1

This invention relates to motor vehicles and has a special utility when applied to a motor driven bicycle or tricycle. The present application is a division of an application for Front end of a motor vehicle, Serial No. 695,592, filed September 9, 1946, of which I am co-applicant.

The vehicle hereinafter described may be called a motor driven bicycle, since it has two wheels, the rear wheel being driven by a motor and the front wheel being turned by handle bars to steer the vehicle. The wheels are smaller, however, than those ordinarily used on bicycles and are placed farther apart so that the rider may sit on a flat seat with his legs together and his feet resting on a flat surface.

The invention has for its objective, the provision of a novel form of structure for supporting the steering shaft bearing and providing an enclosure for the front wheel of the vehicle.

The advantages obtained by the use of this novel structure will be made evident hereinafter.

In the drawings:

Fig. 1 is a view as seen from above the vehicle in which the invention is embodied;

Fig. 2 is a side view of this vehicle;

Fig. 3 is a view of this vehicle as seen from below the vehicle;

Fig. 4 is a longitudinal sectional view of the front end support; and

Fig. 5 is an enlarged side view of the front end of the vehicle shown in Figs. 1, 2 and 3, the outer and inner cones being broken away to illustrate the internal construction.

The present invention is best illustrated by disclosing its application to a motor driven bicycle, which is illustrated in the drawings, Figs. 1, 2, and 3 showing the complete vehicle. This vehicle consists of a body 1 supported on a rear wheel 2 and a front wheel 3, the vehicle being steered by handle bars 4 which turn about a steering axis indicated by the line 4a—4a in various figures. The driver sits upon a seat 5 with his feet on a flat support forming part of the body 1. The rear wheel 2 is driven by an engine 6 situated below and a little behind the seat 5. The engine is controlled by the driver by means forming no part of the invention claimed herein and therefore not described.

In the present improved motor vehicle, the front wheel 3 is rotatable on a wheel shaft or axle 15 which is carried at the lower end of a strut 14 which, in turn, is connected by an arm 13 to a steering shaft 12 (Fig. 3). The shaft 12 is splined at its upper end to a steering tube 31 and the shaft and tube are adapted to turn as a unit in

2 ball bearings (not shown) held in a bearing housing assembly 21 which includes an outer cylindrical shell 22. Adjustably connected to the upper end of the steering tube 31 is a member 51 which carries the handle bars 4.

The method of supporting and attaching the parts previously described on the vehicle body is novel and is described as follows. The frame of the vehicle is composed of formed sheet metal members which are so secured together as to form a longitudinal member 61 which may be made of several pieces welded together and which extends around the front of the vehicle, as shown in Fig. 3. Attached at its lower edge to the member 61 is an outer cone 62, best shown in Fig. 5, having rigidly secured thereto a head 63 which is formed with an upper closure plate 32 enclosing the upper end of the bearing assembly 21. An inner cone 64 is secured at its frustum, as shown in Fig. 4, to the lower end of the outer shell 22 of the steering shaft assembly 21, and the base of the inner cone 64 is welded or otherwise rigidly secured to the inside of the outer cone 62. This double-cone structure provides a very light and strong support for the steering shaft bearing assembly 21, the two cones 62 and 64 and the outer cylindrical shell 22 having the form of a truss on any section radial to the axis 4a—4a. The space below the inner cone 64 and inside the outer cone 62 forms a front wheel cavity 65 in which the front wheel 3 can rotate about its axis. The front wheel cavity 65 is also large enough to allow the wheel 3 to move up and down along the axis 4a—4a within limits. The front wheel cavity 65 is also large enough to allow the front wheel 3 to be removed from its mounting for the purpose of changing the tire of the wheel 3. The walls of the cavity also act as a mud guard to receive mud or water thrown from the front wheel 3.

The novel form of combined steering shaft bearing support and front wheel enclosure, shown in Fig. 5, produces certain advantages. Since the wheel is cantilevered down from the bearing support, the horizontal component of any force exerted by the ground on the wheel parallel to the ground produces a twisting couple, which may occur in various planes passing through the axis 4a—4a and which must be resisted. The circular truss form of the coned bearing supports is well suited to resist any such couple in any direction. The inner cone 64 transmits stresses to the outer cone 62, and, the outer cone 62 having a wide base, all stresses are distributed over a wide area of the frame. The provision of the shaft cavity 65 inside which the wheel can turn freely about the axis 4a—4a and move up and down along this axis not only provides protection for the wheel, but also takes the splash of the wheel. The cavity is made large enough to allow the wheel to be removed for the repair and replacement of the tire thereon.

I claim as my invention:

1. In a vehicle of the class described, the combination of: a vehicle frame; a bearing shell on said vehicle; a bearing in said shell; a steering shaft freely rotatable in said bearing; a conoidal outer sheet metal member secured at its lower end to said frame and at its upper end to the top of said shell; and an inner conoidal sheet metal member secured at its upper end to the lower end of said shell and at its lower end to the inside of said conoidal outer sheet metal member.

2. In a vehicle of the class described, the combination of: a vehicle frame; a bearing shell on said vehicle; a bearing in said shell; a steering shaft freely rotatable in said bearing; a hollow conoidal member secured at its lower base end to said frame and at its upper apex to the upper end of said shell; and an inner truss member having one of its ends secured to the lower end of the shell and its other end secured to the inside of said conoidal member.

3. In a vehicle of the class described, the combination of: a vehicle frame having side members extending longitudinally of the vehicle with their forward ends terminating adjacent the front wheel of the vehicle; a bearing shell on said vehicle; a bearing in said shell; a steering shaft freely rotatable in said bearing; an outer hollow conoidal member having its upper apex secured to the upper end of the shell and having its lower rim secured to said side members and surrounding the wheel in spaced relation thereto to permit turning movement of the wheel within said conoidal member; and an inner truss member having one of its ends secured to the lower end of the shell and its other end secured to the inside of said conoidal member.

4. In a vehicle of the class described, the combination of: a vehicle frame having side members extending longitudinally of the vehicle with their forward ends terminating adjacent the front wheel of the vehicle; a bearing shell on said vehicle; a bearing in said shell; a steering shaft freely rotatable in said bearing; an outer hollow conoidal member having its upper apex secured to the upper end of the shell and having its lower rim secured to said side members and surrounding the wheel in spaced relation thereto to permit turning movement of the wheel within said conoidal member; and an inner conoidal member having its apex secured to the lower end of the shell and its base end secured to the inside of said outer conoidal member, said inner conoidal member overlying the wheel of the vehicle.

5. In a vehicle of the class described, the combination of: a vehicle frame having side members extending longitudinally of the vehicle with their forward ends terminating adjacent the front wheel of the vehicle; a bearing shell on said vehicle; a bearing in said shell; a steering shaft freely rotatable in said bearing; an outer hollow conoidal member having its upper apex secured to the upper end of the shell and having its lower rim secured to said side members and surrounding the wheel in spaced relation thereto; and an inner conoidal member having its apex secured to the lower end of the shell and its base end secured to the inside of said outer conoidal member, said inner conoidal member overlying the wheel of the vehicle and defining with said outer conoidal member a wheel cavity in which the wheel may turn to steer the vehicle.

LEWIS D. THOSTENSON.

REFERENCES CITED

The following references are of record in the file of this patent:

UNITED STATES PATENTS

| Number | Name | Date |
|---|---|---|
| 440,234 | Schaffers | Nov. 11, 1890 |
| 1,216,398 | Baker | Feb. 20, 1917 |
| 2,035,462 | Courtney | Mar. 31, 1936 |